Figure 1:
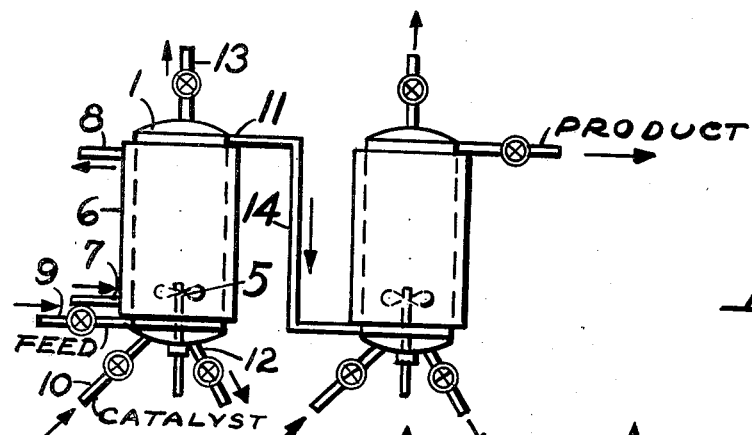

June 30, 1953

B. R. TEGGE 2,643,993

CONTINUOUS PROCESS FOR COPOLYMERIZING
STYRENE AND ISOBUTYLENE

Filed Sept. 13, 1949

Bruce R. Tegge Inventor
By W. H. Smyers Attorney

Patented June 30, 1953

2,643,993

UNITED STATES PATENT OFFICE 2,643,993

CONTINUOUS PROCESS FOR COPOLYMERIZING STYRENE AND ISOBUTYLENE

Bruce R. Tegge, Chatham, N. J., assignor to Standard Oil Development Company, a corporation of Delaware Application September 13, 1949, Serial No. 115,393

3 Claims. (Cl. 260—88.1)

This invention relates to a multi-stage process for manufacturing high molecular weight copolymers by low temperature Friedel-Crafts polymerization. A representative type of copolymer to which the invention may be applied is one made by copolymerizing equal parts by weight of styrene and isobutylene at a temperature of about −80 to −90° C. (corresponding to −112 to −130° F.), in the presence of methyl chloride as diluent and solvent, and in the presence of aluminum chloride as catalyst.

U. S. Patent 2,274,749 describes copolymers of the general type referred to above, e. g. copolymers of isobutylene and styrene, and methods of preparing same, such as copolymerization of the reactants at a temperature below about 0° C., in the presence of an active halide polymerization catalyst, and preferably in the presence of an inert volatile organic liquid serving as solvent and refrigerant. The temperature may range from about −10° C. to −103° C. or lower, and the patent indicates that by adjusting the proportions of the two raw materials, copolymers of desired hardness, melting point, plasticity, etc. may be obtained.

Instead of isobutylene, other aliphatic olefins may be used, preferably having more than two carbon atoms, such as propylene, normal butylenes, etc., and preferably iso-olefins having 4 to 8 carbon atoms, such as isopentene (methyl-2 butene-1) or a pentene obtained by dehydration of secondary amyl alcohol.

Instead of styrene, one may use other polymerizable mono-olefinic compounds containing a cyclic nucleus, these materials preferably being vinyl aromatic compounds, and more preferably hydrocarbons. Examples of some of these materials are: alpha-methyl styrene, para-methyl styrene, alpha-methyl para-methyl styrene, para-chlor styrene, dichlor styrenes, indene, coumarone, alpha-vinyl naphthalene, dihydronaphthalene, etc.

The copolymerization is effected by mixing the two reactants, with or without an inert diluent or solvent, if necessary, such as ethylene, propane, butane, methyl chloride, refined naphtha, etc., and then after cooling the reactants to the desired low temperature, adding an active halide catalyst such as boron fluoride, or activated boron fluoride catalyst (.1% ether added), aluminum chloride, titanium tetrachloride, aluminum alkoxide-aluminum chloride complex $$(AlCl_3 \cdot Al[OC_2H_5]_3)$$

and the like. If desired, such catalyst may be dissolved in a solvent such as a lower alkyl halide, e. g. methyl chloride or ethyl chloride, or carbon disulfide, a low molecular weight sulfur-free saturated hydrocarbon, or a mixture of methyl chloride with butane, at or below the boiling point of the catalyst solvent, and then the catalyst solution cooled down, filtered and added to the reaction mixture. Alternative catalysts includes: $AlCl_3 \cdot AlCl_2OH$, $AlBr_3 \cdot AlBr_2OH$, $AlBr_2Cl \cdot AlOCl$, $AlBrCl_2 \cdot AlOBr$, $TiCl_4 \cdot AlCl_2OH$, $TiOCl_2 \cdot TiCl_4$, $AlBr_3 \cdot Br_2 \cdot CS_2$, $BF_3$ isopropyl alcohol, $BF_3$ solution in ethylene, activated $BF_3$ catalyst in ethylene solution, activated $BF_3$ catalyst in methyl chloride solution. Volatile solvents or diluents, e. g. propane, ethane, ethylene, methyl chloride, carbon dioxide (liquid or solid), etc. may also serve as internal or external refrigerants to carry off the liberated heat of polymerization.

After completion of the copolymerization, residual catalyst is killed with water or alcohol, for example, isopropyl and excess catalyst is removed by washing the product with water and preferably also with dilute aqueous caustic soda. The resulting solid copolymer may range from a viscous fluid or a relatively stiff plastic mass to a hard or tough, thermoplastic resinous solid, depending chiefly upon the temperature of polymerization and the proportion of cyclic reactant in the feed, but also partly on the yield of polymer obtained upon the active feed, and the type and concentration of catalyst. The proportions in which the reactants, e. g., styrene and isobutylene, have actually combined during copolymerization may be determined by interpolation of a carbon-hydrogen analysis between the limits, for instance:

|  | Carbon | Hydrogen |
| --- | --- | --- |
|  | Percent | Percent |
| Pure styrene | 92.3 | 7.7 |
| Pure isobutylene | 85.7 | 14.3 |

Generally, the average molecular weight (by Staudinger method) of the product will range from about 800 upwards, for instance, to 3,000, 5,000, 25,000, 100,000, or much higher, the larger molecular weights, larger intrinsic viscosity (greater than .6) and greater toughness of polymer product at room temperature being obtained at lower polymerization temperatures, e. g., −75° C. to −103° C.; on the other hand, with only moderately low polymerization temperatures such as −40° C. or −20° C., the resulting copolymers are lower in molecular weight and intrinsic viscosity, and are either viscous liquids, soft tacky plastics, or have a hard brittle texture.

Styrene-isobutylene copolymers having, for instance, a combined styrene content of about 50 to 60% by weight, and having suitable combination of high tensile strength, e. g. 1000 to 2000 lbs./sq. in. or higher, and tough thermoplastic characteristics which permit them to be sheeted out into thin, self-supporting films or extruded, molded, or otherwise shaped, have been successfully made by the above-described polymerization process, using batch operation, where the reactants are placed in a reactor with diluent and enough catalyst added, and permitted to continue reaction to 100% conversion, i. e. complete reaction of the polymerizable materials. However, when attempts have been made to carry out this process by continuous operation, the results have not been as successful as desired. One reason for this is that if enough catalyst is used to drive the polymerization to 100% conversion, the resulting copolymer, of for instance, 60% by weight combined styrene, has an excessively low intrinsic viscosity, in the range of about 0.25 to 0.30, even though the polymerization is effected at a relatively low temperature, e. g. −130° F. On the other hand, if such a continuous polymerization process is carried out with less catalyst and shorter time so as to stop the reaction short of completion, the resulting copolymer, for similar per cent styrene in the polymerization feed and similar temperature, will have materially higher intrinsic viscosity, e. g. about 0.5 for 80% conversion, about 0.75 for 50% conversion, or about 0.95 for 30% conversion, but all of such partial conversion operations involve the serious disadvantage of recovering, purifying, and recycling unpolymerized raw materials, and there are a number of other minor disadvantages, for instance, lower reactor heat transfer coefficients.

In comparison, a batch polymerization of a styrene-isobutylene feed containing 60% by weight of styrene, at a similar temperature of −130° F., and a similar methyl chloride diluent ratio (about 5 volumes) the resulting copolymer had an intrinsic viscosity of about 1.25 at 30% conversion, about 1.15 at 50% conversion, about 1.0 at 80% conversion, and about 0.95 at 100% conversion. However, batch operation is attended with several disadvantages. One of these is that from a product quality point of view, the copolymer product possesses an undesirably wide spread both in the molecular weight of the individual molecules and in their chemical composition, i. e., the ratio of combined styrene to isobutylene. Another disadvantage from a practical operating point of view is that in batch operation, necessarily involving frequent charging and discharging of reactors, it is extremely difficult to avoid excessive leakage of the methyl chloride or other volatile solvents used. Other disadvantages of batch operation include: excessive fluctuation of refrigeration loads, high maintenance of equipment, relatively large amount of labor, long operating time and large reactor volumes for any particular quantity production, relatively low catalyst efficiency, the necessity of an inert gas zone in the reactor for catalyst solvent addition and pressuring of the reactor liquid during the batch cycle operation, etc.

It has now been found that most of the advantages of both batch and continuous operation can be obtained, with little of the disadvantages of either, by using a continuous polymerization system in which the polymerization reactants, diluent and catalyst are continuously mixed together in a first reactor until a partial conversion of about 30 to 70%, preferably about 40 to 60% by weight, is obtained, and then the reaction mixture, containing polymer and unreacted raw materials, is then passed continuously, either by overflowing, pumping or other suitable means into one or more additional reactors. If a two-stage process is used, the second stage will, of course, be run to about 97 to 100% conversion, whereas if a three-stage process is used, then the second stage should be run to a conversion of about 60 to 90%, preferably about 65 to 85%, and then in the third stage the conversion should be as high as possible, e. g. 97 to 100%. If desired, a fourth stage may be used, in which case the third stage should be carried to a conversion of about 80 to 95%, preferably about 85 to 90%, and then the reaction completed as nearly as possible in the fourth stage.

By thus using a multiple-stage continuous operation to substantially 100% conversion, the resulting final product is essentially a mixture of a plurality of different relatively homogeneous copolymers made in the separate stages, and will not be as homogeneous as a corresponding product made in a single stage continuous operation, but it will be as high in molecular weight or intrinsic viscosity as any such product made at a conversion of about 50% to 60% in a continuous single stage process. It will be relatively much more homogeneous, both as to molecular weight spread and as to chemical composition than a product made by 100% conversion by batch operation.

A few examples of desirable conversions to be used in the several stages in various two, three and four-stage continuous polymerization processes, according to this invention, are outlined in the following table:

TABLE I

*Percent conversion*

| Stage | 1 | 2 | 3 | 4 |
|---|---|---|---|---|
| a | 50-65 | 97-100 | | |
| b | 60 | 97-100 | | |
| c | 50 | 97-100 | | |
| d | 30-70 | 60-90 | 97-100 | |
| e | 40-60 | 65-85 | 97-100 | |
| f | 50-55 | 70-80 | 98-100 | |
| g | 50 | 80 | 97-100 | |
| h | 60 | 90 | 97-100 | |
| i | 20-60 | 80 | 90 | 97-100 |
| j | 40 | 70 | 90 | 97-100 |
| k | 30 | 60 | 90 | 97-100 |

Figure 2:
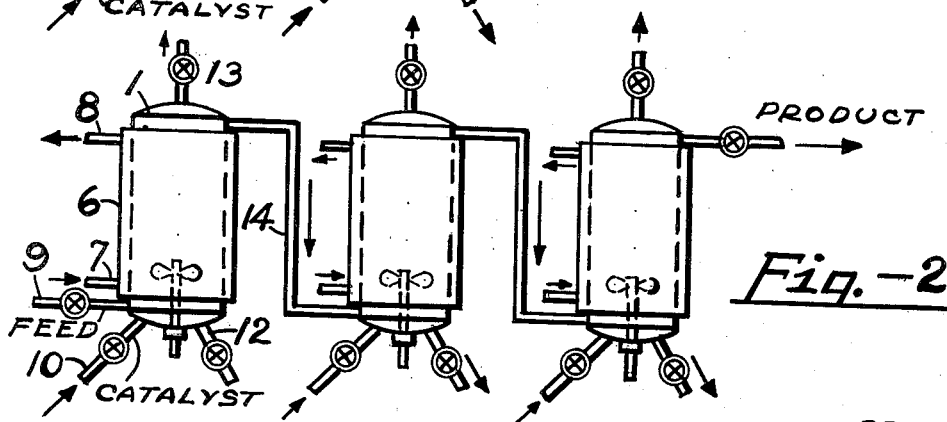
Figure 3:
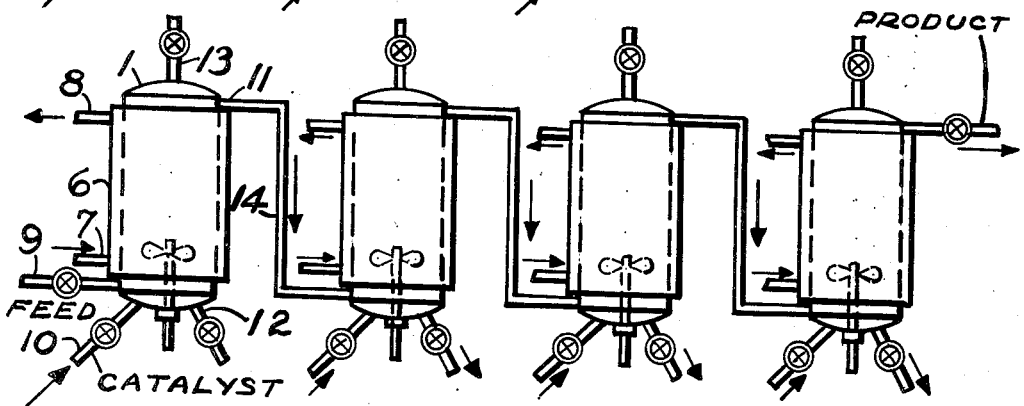

It is not intended that the invention be limited to the use of any particular type of reactor to be used in the several stages of this continuous polymerization process, because the particular design of reactor can be varied considerably in size, shape, cooling means, type and amount of agitation, as well as methods of feeding the reactants, diluent and catalyst to the reactor and discharging the polymerization mixture from the reactor. However, for the sake of convenient illustration, several alternative multi-stage reactor systems are shown in schematic outline in the attached drawing in which Figure 1 represents a two-stage system;
Figure 2 a three-stage system, and
Figure 3 a four-stage system.

In each of the figures, like reference numerals represent like parts.

Referring to the drawing, in the various figures, reference numerals 1, 2, 3, and 4 indicate a polymerization reactor in the first, second, third or fourth-stage respectively. Each reactor is equipped with an agitator 5, preferably of a high speed type capable of quickly mixing the liquid contents of the reactor. Each reactor is also provided with suitable cooling means, here illustrated by an external cooling jacket 6 into which a suitable refrigerant is fed in through inlet 7 and withdrawn through outlet 8. Each reactor is also provided with an inlet 9 for all of the reaction liquid constituents except the catalyst, which latter is fed in through inlet 10. The polymerization reaction liquid is normally removed from each reactor through the overflow outlet 11, although a drain outlet 12 is provided for emptying the contents of a reactor when the process is discontinued, either for occasional cleanouts, repairs, or other reasons.

A vent 13 may be provided, either for use as a safety valve, or for use in removing and recycling gases or vapors, such as would be necessitated in the use of an internal refrigerant. Pipelines 14 serve to connect the discharge outlet 11 of one reactor to the feed inlet line 9 of the reactor in the following stage.

Although it is believed that the advantages of the multi-stage continuous process of this invention can be applied to some extent to the relatively lower molecular weight copolymers, e. g., having an intrinsic viscosity in the range of 0.1 to 0.5, which are made at copolymerization temperatures ranging from about +10° F. down to about −50° F. or somewhat lower, it is believed that the process of the invention serves its greatest usefulness when applied to copolymerization in the lower temperature range of about −100° F. to −140° F., and furthermore, in this particularly low temperature range, the invention is especially applicable to the manufacture of copolymers having not only an intrinsic viscosity of at least 0.5, and preferably from 0.7 to 1.5, but also having a combined content of styrene or equivalent cyclic material of about 50 to 65% by weight.

The invention will be better understood from a consideration of the following experimental data:

*Examples 1–3*

A three-stage continuous polymerization system was set up in the laboratory, using 3 reactors of 5 liter capacity, each having an external cooling jacket in which liquefied ethylene was used as refrigerant. Each reactor was equipped with an agitator.

The three reactors were connected in series with trough-type overflows.

The different continuous runs were made in this three-stage continuous polymerization system, using in each of the three runs a polymerization feed consisting of 50% by weight of styrene and 50% of isobutylene, and using methyl chloride as diluent, and an AlCl$_3$-methyl chloride catalyst solution having a concentration of about 0.1 gram per 100 cc.

In Examples 1 and 2, a 25 wt. per cent of polymerizable feed was used (balance 75% being methyl chloride diluent), whereas in Example 3, a more dilute system was used in which the feed was only 15% by weight. The temperature in all three runs ranged from about −75 to −100° C., the first two runs being from −75 to −90° C., and run 3 being from −90 to −100° C.; this resulted in slightly higher intrinsic viscosities in run 3.

In all three of these examples, the feed and catalyst rates were maintained at a relatively high level (about 500 and 35 cc. per minute, respectively) until equilibrium was approached; the rates were then reduced to the lower levels shown in the following Table 2 which also shows the per cent conversion, the per cent combined styrene in the copolymer, and the intrinsic viscosity of the copolymer, cumulatively in the first, second and third stages of each of the three examples. The residence time of the liquid polymerization mixture in each of the reactors was about 15 to 25 minutes.

TABLE II

EXAMPLE 1.—25 WEIGHT PERCENT FEED

| Stage No. | Feed Rate, Cc./Min. | Cat. Rate, Cc./Min. | Percent Conversion | Percent Styrene | Intrinsic Viscosity |
|---|---|---|---|---|---|
| 1 | 200 | 20 | 50 | 41.5 | 1.0 |
| 2 | 220 | 70 | 80 | 50 | 0.93 |
| 3 | 290 | 100 | 100 | 51.5 | 0.83 |

EXAMPLE 2.—25 WEIGHT PERCENT FEED

| 1 | 200 | 14 | 50 | 45 | 1.19 |
|---|---|---|---|---|---|
| 2 | 214 | 30 | 70 | 47 | 1.08 |
| 3 | 244 | 75 | 100 | 55 | 0.84 |

EXAMPLE 3.—15 WEIGHT PERCENT FEED

| 1 | 200 | 23 | 57 | 38 | 1.45 |
|---|---|---|---|---|---|
| 2 | 223 | 40 | 79 | 47 | 1.2 |
| 3 | 263 | 80 | 100 | 49 | 1.08 |

Referring particularly to Example 1, it will be noted that the per cent conversion (after equilibrium had been established in each of the three reactors) was 50% conversion in the first reactor, 80% in the second, and 100% in the third. The per cent combined styrene in the first reactor was 41.5, in the second reactor 50, and in the third reactor 51.5, the corresponding intrinsic viscosities in the three reactors being 1.0, 0.93, and 0.83 in the last reactor. This indicates that in this three-stage continuous process, where polymerization was carried to a final 100% conversion, the resulting copolymer had an average styrene content of 51.5% and an average intrinsic viscosity of 0.83. The chief operating variable in obtaining these different conversion levels in the three reactors is the catalyst rate which in cc. per minute range from 20 in the first reactor to 70 in the second and 100 cc. per minute in the third reactor.

In Example 2, the overall results were somewhat comparable with those obtained in Example 1 except that the per cent combined styrene in the copolymers is slightly higher.

In Example 3 where, as indicated previously, the temperature used was about 10° C. lower than that used in Examples 1 and 2, the intrinsic viscosities of the fractions obtained in the first, second and third stage reactor were all slightly higher. This is a direct result of the lower temperature of polymerization.

Five other experiments were run which illustrate the principles of the invention. In Examples 4 to 7 inclusive, the reaction temperature was maintained at about −83° C. (−117° F.) or slightly lower. In all of Examples 4 to 8 inclusive, styrene and isobutylene were the reactants, methyl chloride the diluent, and the catalyst was a solution of aluminum chloride in methyl chloride in a concentration of about 0.07 to 0.20 gram per 100 cc. and fed at a rate of 20 to 100 cc. per minute in Examples 4 to 7 and the reactants-diluent feed being 150 cc./min.

Example 4

This experiment was run as a two-stage polymerization process. In the first stage, the feed amounted to 15% by weight, with 50% by weight styrene in the feed, and was run to a conversion of 57%, yielding in this first stage a product having an average styrene content of about 40% by weight and an intrinsic viscosity of 1.18. In the second stage, where the reaction was run to completion (98%+ in conversion) the product produced in this second stage had an average styrene content of 57.5% by weight and an intrinsic viscosity of 0.335. The overall blend of the products produced in the first and second stages gave an average combined styrene content of about 47.5% by weight and an intrinsic viscosity of 0.82. This experiment shows that the advantages of this invention can be obtained fairly well even with only a two-stage continuous process. The product here consisted essentially of a mixture of two products, having the constituents in the proportions indicated and having the composition and characteristics indicated.

Example 5

This experiment was similar to Example 4 except that here a 25% by weight feed was used (instead of 15%), and the process was operated in three stages. In the first stage, the conversion was 46% and the product had an average styrene content of 35.5% and an intrinsic viscosity of 1.40. In the second stage the overall conversion was run to 75.3%, the product made in this second stage having an average styrene content of 45% and an intrinsic viscosity of 1.29. In the third stage (substantially complete conversion) the product averaged 67.5% styrene and an intrinsic viscosity of 0.42. The overall blend of the products of all three stages averaged 47.2% styrene and an intrinsic viscosity of about 1.12.

These data show that the three-stage system of Example 5 gave better results (intrinsic viscosity 1.12 compared to 0.82) than the two-stage system of Example 4.

Example 6

This experiment was identical with Examples 4 and 5 except that here a 35 wt. per cent hydrocarbon feed was used (i. e. 65 wt. per cent methyl chloride diluent). In the first stage, the conversion was 43.5% and the product showed 39.5% combined styrene and an intrinsic viscosity of 1.14. In the second stage, the conversion was an additional 57% of unreacted materials present, thus amounting to an overall conversion of 75.7%, and the product made in the second stage had a combined styrene content of 53% and an intrinsic viscosity of 1.23. In the third stage, conversion went to 98+%, substantial completion, and the product made in this stage had a combined styrene content of 71% with an intrinsic viscosity of 0.35.

The overall blend of the products made in these three stages, gave a combined styrene content of 51.0% and an intrinsic viscosity of 0.97.

By comparing Examples 4, 5 and 6 which all three were made using an initial feed containing 50 wt. per cent styrene and 50 wt. per cent isobutylene but with hydrocarbon feed concentrations of 15, 25 and 35% respectively, the data indicates that Example 5, using a 25 weight per cent hydrocarbon feed gave an overall product having the highest intrinsic viscosity (1.12). Thus, although the entire range from 15 to 35 wt. per cent hydrocarbon feed gives very good results, the preferred range is about 20 to 30 weight per cent hydrocarbon feed, or roughly 2 to 4 parts by weight of methyl chloride diluent per part by weight of styrene-isobutylene reactants.

Example 7

This experiment was somewhat similar to Example 4 in that a 15 wt. per cent hydrocarbon feed was used, but in this case the hydrocarbon feed contained 60% of styrene and 40% of isobutylene, and the process was run in three stages instead of two.

In the first stage, the conversion was 66% and the product showed a combined styrene content of 56% with an intrinsic viscosity of 1.07. In the second stage, the conversion was 78% of reactants present, thus giving an overall conversion thus far of 92.5%, and the product made in the second stage had a styrene content of about 68% with an intrinsic viscosity of 0.70. In the third stage, the conversion went to substantial completion (98+%) and the product made in this stage, although not analyzed for styrene, showed an intrinsic viscosity of 0.27.

The overall blend of the products of these three stages indicated a combined styrene content of about 60.8% with an intrinsic viscosity of 0.91, thus, when these results are compared with the data given in the earlier part of the specification for a batch polymerization of a feed containing 60% styrene, where the product had 50% conversion showed an intrinsic viscosity of about 1.15 and at 80% conversion an intrinsic viscosity of about 1.0 and at 100% conversion an intrinsic viscosity of about 0.95, it is apparent that the results of the three-stage continuous operation with 60% styrene feed gives an overall product having almost as good average intrinsic viscosity, but without the excessively wide distribution in molecular weight and styrene content of the copolymer molecules in the mixed product. Furthermore, this three-stage continuous process possesses the many operational advantages over batch operation which have previously been discussed.

Example 8

This experiment was patterned along the same general liens as Examples 4 to 7, but different laboratory equipment was used. This set-up represented a three-stage continuous system in which the initial polymerization feed contained 60% styrene, 40% isobutylene and was used in a monomer concentration of 25 wt. per cent hydrocarbon (with 75% of methyl chloride). A temperature of about −130° F. was used throughout these three stages. The catalyst feed was at the rate of 17.0, 17.2 and 31 lbs. per 100 lbs. of hydrocarbon feed respectively in the three stages. In the first stage, the conversion amounted to 44% and the polymer had a styrene content of 48.0% with an intrinsic viscosity of 1.22. In the second stage, the conversion was 58% of polymerizable constituents present, thus giving a cumulative conversion of 76.5%, and the product made in the second stage reactor had a styrene content of 65.2 with an intrinsic viscosity of 0.93. In the third reactor, conversion went substantially to 100% and the product was calculated to have a combined styrene content of 79.4 with an intrinsic viscosity of 0.14. An overall blend of these three products gives an average intrinsic viscosity of 0.87, with a styrene content of 61.0. This compares very favorably with the 0.91 average intrinsic viscosity obtained in Example 7 for a similar preparation of a copolymer having 60% combined styrene but starting with a 15 wt. per cent feed as compared to the 25 wt. per cent feed of Example 8.

It is not intended that this invention be limited to the specific examples and modifications shown, which have been given merely for the sake of illustration, but only by the appended claims in which it is intended to claim all novelty inherent in the invention as well as all modifications coming within the scope and spirit of the invention.

I claim:

1. In the process of copolymerizing styrene and isobutylene at a temperature of about −100° F. to −140° F. in the presence of about 1 to 5 volumes of methyl chloride per volume of reactans, and in the presence of a Friedel-Crafts catalyst, using proportion of reactants to produce copolymers having a combined styrene content of about 40 to 70% by weight, the improvement comprising effecting the polymerization continuously in three stages, in the first one of which the polymerization is carried out to a conversion of about 30 to 70%, in the second stage to a total of about 60 to 90%, and in the third stage to substantial completion, the amount of said conversion being controlled by adding increasing amounts of catalyst in the successive stages.

2. A process according to claim 1 in which the polymer produced in the first stage has a molecular weight substantially greater than the overall average molecular weight of the final product.

3. In the process of coplymerizing an alkene of 3 to 5 carbon atoms with a polymerizable mono-olefinic aromatic compound selected from the group consisting of hydrocarbons and chlorstyrenes at a temperature of $+10°$ F. to $-160°$ F. in the presence of about 0.5 to 10 volumes of inert diluent-solvent per volume of reactant, and in the presence of a Friedel-Crafts catalyst, the improvement comprising effecting the polymerization continuously in 2 to 4 stages, in the first one of which the polymerization is carried out to a conversion of 20 to 70% by weight, by using only sufficient catalyst for that percent conversion in the first stage, and adding more catalyst in at least one later stage, whereby a final conversion of 97 to 100% is obtained.

BRUCE R. TEGGE.

References Cited in the file of this patent

UNITED STATES PATENTS

| Number | Name | Date |
|---|---|---|
| 2,274,749 | Smyers | Mar. 3, 1942 |
| 2,363,951 | Fikentscher | Nov. 28, 1944 |
| 2,445,970 | Reinhardt | July 27, 1948 |
| 2,537,130 | Green | Jan. 9, 1951 |